United States Patent
Heinen et al.

(10) Patent No.: US 11,228,380 B2
(45) Date of Patent: Jan. 18, 2022

(54) BIT ERROR RATIO (BER) MEASUREMENT INCLUDING FORWARD ERROR CORRECTION (FEC) ON BACK CHANNEL

(71) Applicant: Keysight Technologies, Inc., Santa Rosa, CA (US)

(72) Inventors: Martin Heinen, Boeblingen (DE); Axel Wankmueller, Boeblingen (DE)

(73) Assignee: Keysight Technologies, Inc., Santa Rosa, CA (US)

( * ) Notice: Subject to any disclaimer, the term of this patent is extended or adjusted under 35 U.S.C. 154(b) by 0 days.

(21) Appl. No.: 17/007,190

(22) Filed: Aug. 31, 2020

(65) Prior Publication Data

US 2021/0126721 A1 Apr. 29, 2021

Related U.S. Application Data

(60) Provisional application No. 62/927,535, filed on Oct. 29, 2019.

(51) Int. Cl.
*H04B 17/29* (2015.01)
*H04B 17/00* (2015.01)

(52) U.S. Cl.
CPC ......... *H04B 17/29* (2015.01); *H04B 17/0085* (2013.01)

(58) Field of Classification Search
CPC ............................ H04B 17/29; H04B 17/0085
See application file for complete search history.

(56) References Cited

U.S. PATENT DOCUMENTS

| | | | | |
|---|---|---|---|---|
| 4,271,514 A | * | 6/1981 | Parras | H04L 1/14 714/716 |
| 6,047,396 A | * | 4/2000 | Hillis | G06F 11/1012 714/763 |
| 6,493,320 B1 | * | 12/2002 | Schober | H04B 17/0085 370/241 |
| 7,010,730 B1 | | 3/2006 | Jaworski et al. | |
| 7,231,558 B2 | | 6/2007 | Gentieu et al. | |
| 7,801,206 B2 | | 9/2010 | Calvin et al. | |

(Continued)

FOREIGN PATENT DOCUMENTS

JP 2000-341365 A 12/2000
JP 2000341365 A * 12/2000

OTHER PUBLICATIONS

English Translation of Abstract for JP2000341365A, 1 pg.

(Continued)

*Primary Examiner* — Dominic E Rego

(57) ABSTRACT

A method of determining the bit error ratio (BER) of a device under test (DUT) includes transmitting a first signal of an original test bit pattern over a first channel to a receiver of the DUT, and forward error correction (FEC) encoding the original test bit pattern of the first signal transmitted to the receiver of the DUT in a loopback mode of the DUT to generate an FEC encoded test bit pattern. The method further includes transmitting a second signal of the FEC encoded test bit pattern from a transmitter of the DUT over a second channel, and FEC decoding the FEC encoded test bit pattern of the second signal to obtain a decoded test bit pattern and comparing the decoded test bit pattern with the original test bit pattern to determine a BER of the DUT.

20 Claims, 4 Drawing Sheets

(56) References Cited

U.S. PATENT DOCUMENTS

| | | | | |
|---|---|---|---|---|
| 7,817,184 B1* | 10/2010 | Michener | ............... | H04N 17/04 348/189 |
| 8,433,969 B1* | 4/2013 | Wu | ............... | H04L 1/0039 714/751 |
| 2003/0149922 A1* | 8/2003 | Lai | ............... | G01R 31/31723 714/724 |
| 2004/0205427 A1* | 10/2004 | Ichikawa | ............... | G11C 29/4401 714/710 |
| 2006/0176994 A1* | 8/2006 | Miller | ............... | H03L 7/1072 375/376 |
| 2006/0250972 A1 | 11/2006 | Seebacher et al. | | |
| 2007/0047513 A1* | 3/2007 | Anderson | ............... | H04L 1/0041 370/345 |
| 2007/0088991 A1* | 4/2007 | Shin | ............... | H04L 1/242 714/700 |
| 2008/0204040 A1* | 8/2008 | Muljono | ............... | G01R 31/2818 324/606 |
| 2008/0222474 A1* | 9/2008 | Hiraide | ............... | G01R 31/318538 714/739 |
| 2009/0113258 A1* | 4/2009 | Parthasarathy | ............... | H04L 43/50 714/716 |
| 2011/0085364 A1* | 4/2011 | Shimano | ............... | G11C 15/04 365/49.17 |
| 2011/0129392 A1* | 6/2011 | Yamamoto | ............... | F04B 19/24 422/186 |
| 2011/0299569 A1* | 12/2011 | Baba | ............... | G01R 31/31707 375/130 |
| 2014/0153625 A1* | 6/2014 | Vojcic | ............... | G06F 11/1625 375/224 |
| 2015/0200684 A1* | 7/2015 | Kanievskyi | ............... | H04L 1/0056 714/703 |
| 2016/0080110 A1* | 3/2016 | Gareau | ............... | H04L 1/0045 398/66 |
| 2016/0217768 A1* | 7/2016 | Pyun | ............... | G09G 3/20 |
| 2016/0248254 A1* | 8/2016 | Huomo | ............... | H02J 13/0006 |
| 2017/0099099 A1* | 4/2017 | Papakos | ............... | H04J 14/021 |
| 2017/0214398 A1* | 7/2017 | Usugi | ............... | H03K 5/15066 |
| 2017/0351795 A1* | 12/2017 | Ghattas | ............... | G06F 30/33 |
| 2017/0366381 A1* | 12/2017 | Zoellner | ............... | H04L 1/0057 |
| 2017/0367246 P1* | 12/2017 | Hansen | ............... | A01H 5/02 Plt./455 |
| 2018/0183633 A1* | 6/2018 | Ho | ............... | H04L 7/033 |
| 2018/0270018 A1* | 9/2018 | Mushkin | ............... | H04L 1/0064 |

OTHER PUBLICATIONS

S. Detraza et al., "FPGA-based Bit-Error-Rate Tester for SEU-hardened Optical Links," CERN, 1211 Geneva 23, Switzerland, Jan. 2009, pp. 636-640.

* cited by examiner

BIT ERROR RATIO (BER) MEASUREMENT INCLUDING FORWARD ERROR CORRECTION (FEC) ON BACK CHANNEL

CROSS-REFERENCE TO RELATED APPLICATIONS

This present application is claims priority under 35 U.S.C. § 119(e) from U.S. Provisional Application 62/927,535 filed on Oct. 29, 2019, which names Martin Heinen, et al. as inventors. The entire disclosure of U.S. Provisional Application 62/927,535 is specifically incorporated herein by reference.

BACKGROUND

Bit Error Ratio (BER) measurements are widely used in datacom and telecom applications and required by many standards to characterize the ability of a receiver to correctly recover the information send by a transmitter. As data rates increase the loss on the path from the device under test (DUT) to the test equipment (back channel) increases up to an amount making the measurement impossible with the accuracy needed.

A Bit Error Ratio (BER) measurement is used to characterize the performance of a digital receiver such as the sensitivity of digital communication devices and systems. The test equipment creates a test signal of known quality and transmits it to the receiver. The receiver detects the signal and forwards the data to its own transmitter. This is known as "loopback mode". The test equipment's error detector receives the data transmitted from the DUT through the so called "back channel". The test equipment compares the data sent with the data received and counts the number of bits that do not match. The ratio of the number of false bits divided by the total number of sent bits is called the "bit error ratio". Standards require this ratio to be lower than a specified value to guarantee a certain quality of transmission.

As data rates increase due to higher bandwidth demands the loss of the back channel increases too. This in turn requires higher sensitivity of the error detector leading to more expensive test equipment and/or less accurate measurements.

SUMMARY

According to an aspect of the inventive concepts, a method of determining the bit error ratio (BER) of a device under test (DUT) is provided. The method includes transmitting a first signal of an original test bit pattern over a first channel to a receiver of the DUT, and forward error correction (FEC) encoding the original test bit pattern of the first signal transmitted to the receiver of the DUT in a loopback mode of the DUT to generate an FEC encoded test bit pattern. The method further includes transmitting a second signal of the FEC encoded test bit pattern from a transmitter of the DUT over a second channel, and FEC decoding the FEC encoded test bit pattern of the second signal to obtain a decoded test bit pattern and comparing the decoded test bit pattern with the original test bit pattern to determine a BER of the DUT.

According to another aspect of the inventive concepts, a test set-up for testing a bit error ratio (BER) is provided. The test set-up includes a pattern generator configured to generate an original test bit pattern, and to transmit a first signal of the original test bit pattern on a first channel. The test set-up further includes a device under test (DUT) including a receiver in communication with the first channel, a transmitter in communication with a second channel, and a forward error correction (FEC) encoder operative within a loopback between the receiver and transmitter. The DUT is operative in a loopback mode to FEC encode the original test bit pattern of the first signal transmitted on the first channel to obtain an FEC encoded test bit pattern, and to transmit a second signal of the FEC encoded test bit pattern on the second channel. The test set-up further includes an error detector including a forward error correction (FEC) decoder. The error detector is configured to decode an FEC encoded test bit pattern of the second signal received on the second channel to obtain a decoded test bit pattern, and to compare the decoded test bit pattern with the original test bit pattern to determine a BER of the DUT.

According to another embodiment of the inventive concepts, a device operative in a loopback mode for testing of the device is provided. The device includes a receiver circuit for receiving a first signal on a first channel, a transmitter circuit transmitting a second signal on a second channel, and loopback circuitry between the receiver and the transmitter and including a forward error correction (FEC) encoder. In in the loopback mode the FEC encoder is operative to FEC encode a test bit pattern of a first signal transmitted to the receiver on the first channel to obtain an FEC encoded test bit pattern, and the transmitter is operative to transmit a second signal of the FEC encoded test bit pattern on the second channel.

BRIEF DESCRIPTION OF THE DRAWINGS

The above and other aspects and features of the inventive concepts will become readily apparent from the detailed description that follows, with reference to the accompanying drawings, in which.

DETAILED DESCRIPTION

To eliminate or reduce the effect of the back channel induced errors on the error count in bit error ratio (BER) measurements of a device under test (DUT), embodiments of the inventive concepts incorporate forward error correction (FEC) in the return path to the BER test equipment. Forward error correction can compensate for a given amount of errors as defined by the error correction algorithm being used. The DUT enables FEC coding of a received test pattern, and the error detector decodes the signal. Errors introduced by the return path are eliminated leaving only those errors caused by the receiver for comparison and calculation.

Figure 1:
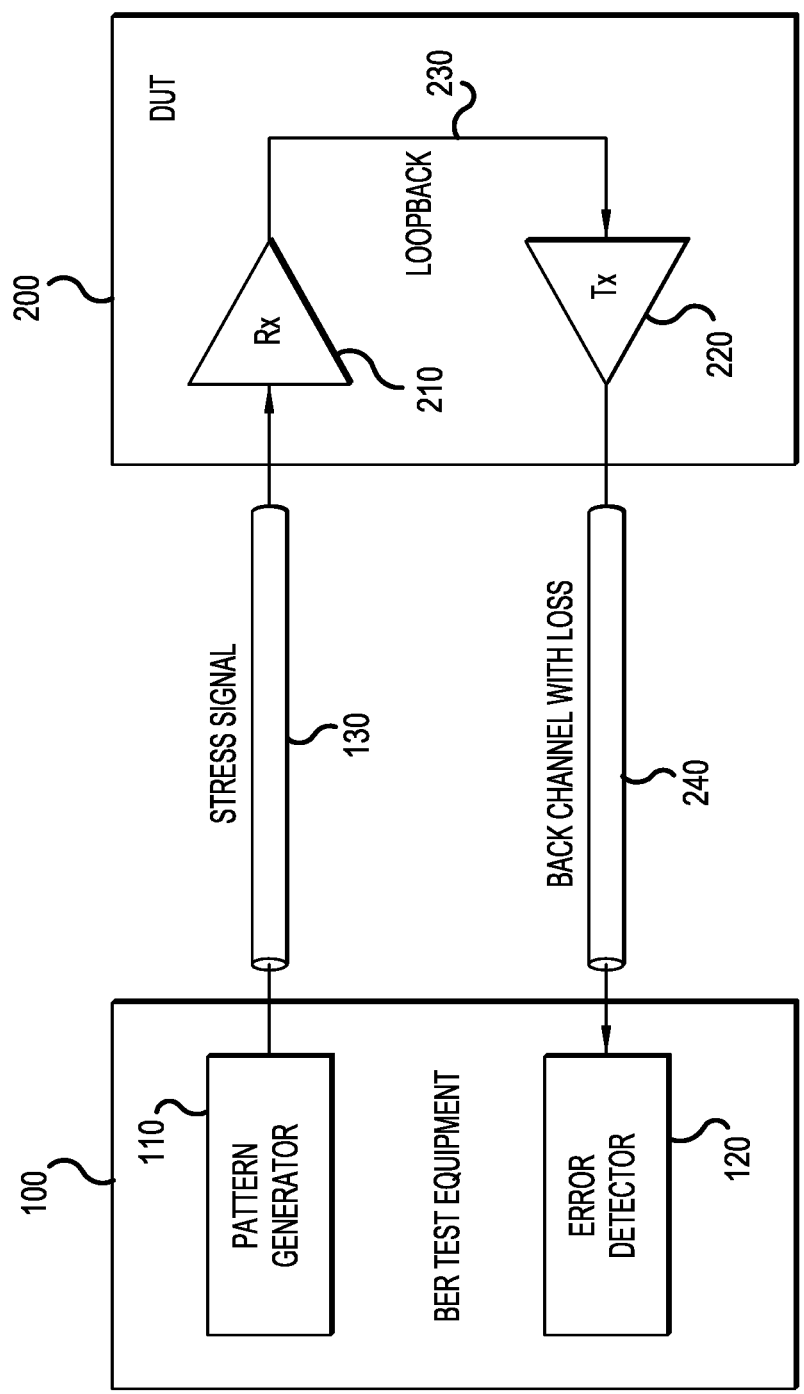
FIG. 1 is a schematic diagram of a bit error ratio measurement set-up according to a comparative example.

As a comparative example, attention is directed to the BER test set-up shown in the schematic diagram of FIG. 1. The set-up is intended to measure the ratio of erroneous digital signals (bits) generated by the DUT to the total number of regarded digital signals generated by the DUT. An "acceptable" bit error ratio will depend on the application of the DUT, but to provide context, typical standards dictate that bit error ratios should not exceed a threshold in a range of $10^{-9}$ to $10^{-12}$. In other words, one error in $10^9$ to $10^{12}$ transmitted bits may be deemed acceptable depending on application. As shown in FIG. 1, the BER test equipment 100 of the comparative example is equipped with a pattern generator 110 and an error detector 120. The pattern generator 110 is configured to generate a given test bit pattern which is output as a digital stress (or stimulus) signal on a downlink channel 130. The DUT 200 includes a receiver (Rx) 210 and a transmitter Tx 220. The stress signal retrieved on the uplink channel 130 is received by the Rx 210, and the DUT 200 is operative in a test mode to reconstruct and retransmit the received test bit pattern through the Tx 220 on a back (uplink) channel 240. As mentioned previously, this test mode of the DUT is referred to in the art as a "loopback mode", and the related loopback circuitry is represented in FIG. 1 by reference number 230. The error detector 120 of the BER test equipment analyzes the data pattern received on the back channel 240 data to see how closely it matches the data bits of the test bit pattern originally sent on the downlink 130. The BER of the DUT 200 is determined accordingly.

As suggested previously, signal loss of the back channel 240 becomes increasingly worse with increasing data transmission rates. Such loss can be reflected in data bit errors which are indistinguishable from bit errors introduced by the DUT 200, making a reliable assessment of the BER of the DUT 200 difficult at best.

Figure 2:
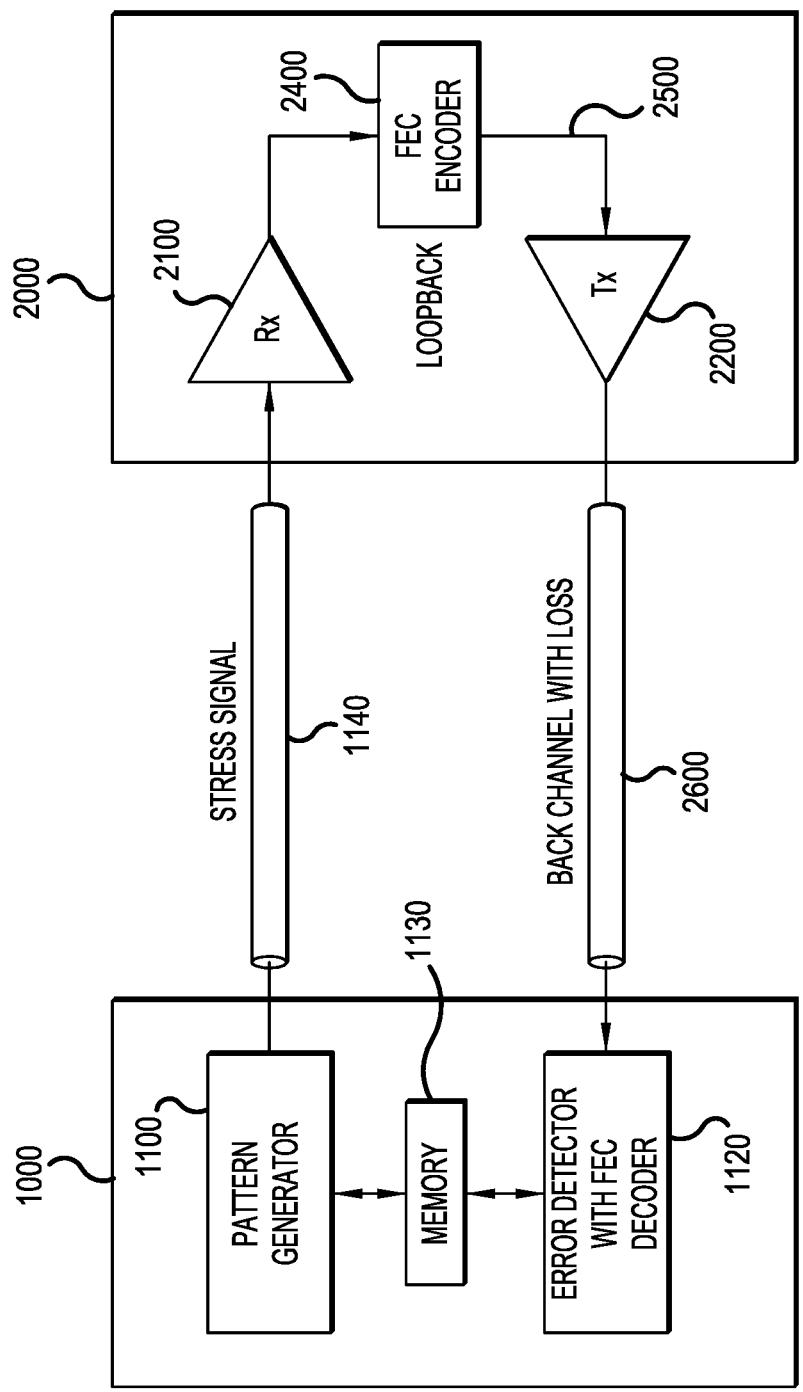
FIG. 2 is a schematic diagram of a bit error ratio measurement set-up according to an embodiment of the inventive concepts.

Attention is now directed to the BER test set-up shown in the schematic diagram of FIG. 2 according to an embodiment of the inventive concepts.

As shown in FIG. 2, the BER test equipment 1000 of the example of this embodiment is equipped with a pattern generator 1100, an error detector 1120, and a memory 1130. The error detector 1120 includes a forward error correct (FEC) decoder as will be explained below. The pattern generator 1100 is configured to generate an original test bit pattern which is output as a digital stress (or stimulus) signal on a downlink channel 1140. The original test bit pattern may optionally be stored in advance and retrieved from the memory 1130 by the pattern generator 1100.

The DUT 2000 includes a receiver (Rx) 2100, a transmitter Tx 2200 and a forward error correction (FEC) encoder 2400 operatively included in loopback circuitry 2500 of the DUT 2000. In an embodiment, the FEC encoder is enabled upon entry of the DUT 2000 into a loopback mode. The stress signal transmitted on the uplink channel 1140 is received by the Rx 2100, and the loopback circuitry 2500 of the DUT 2000 is operative in the loopback mode to reconstruct the received test bit pattern and to apply the thus reconstructed data to the enabled FEC encoder 2400.

The data that has been encoded by the FEC encoder is then transmitted through the Tx 2200 on a back channel 2600. The FEC decoder of the error detector 1120 is configured to decode the FEC encoded test bit pattern data received on the back channel 2600 to obtain a data pattern. This decoded data pattern is then analyzed by the error detector 1120 of the BER test equipment 1000 to see how closely it matches the data bits of the test bit pattern originally sent on the downlink 1140. The BER of the DUT 2000 is determined accordingly. Optionally, the error detector 1120 may retrieve the originally transmitted test bit pattern from the memory 1130.

The FEC encoding in the loopback is effective to compensate for bit errors introduced in back channel 2600. That is, FEC encoding adds redundant bits to data stream, while the FEC decoder is operative such that the BER test equipment 1000 recognizes only the portion of the data that contains no apparent errors. Errors introduced by the back channel may be eliminated leaving only those errors caused by the DUT 2000 for comparison and calculation of the BER, thus allowing for a more reliable assessment of the BER of the DUT 2000.

Figure 3:
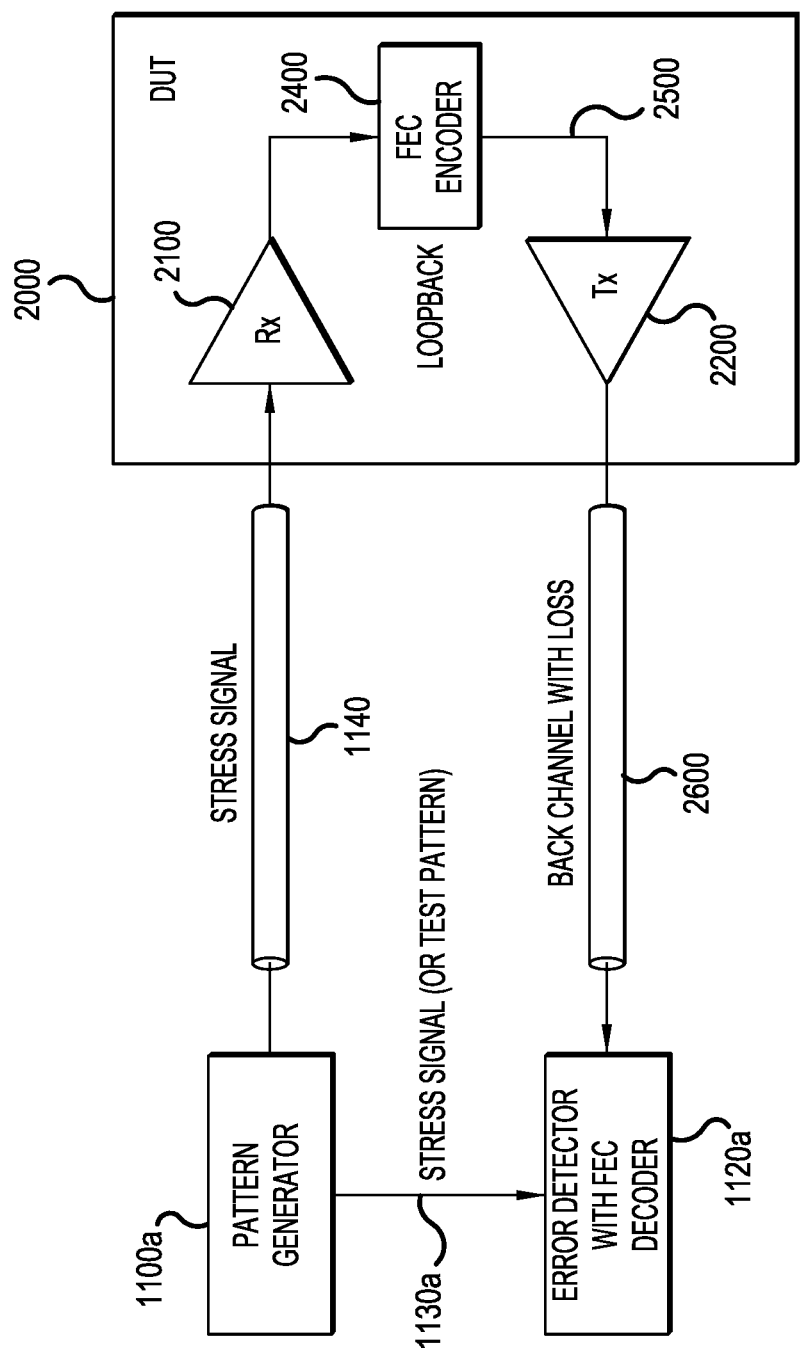
FIG. 3 is a schematic diagram of a bit error ratio measurement set-up according to an embodiment of the inventive concepts.

Attention is now directed to the BER test set-up shown in the schematic diagram of FIG. 3 according to an embodiment of the inventive concepts. Like reference numbers refer to like elements in FIGS. 2 and 3. The embodiment of FIG. 3 differs from that of FIG. 2 in that the pattern generator and error detector which constitute the BER test equipment are physically separated and connected by a data link.

As shown in FIG. 3, the BER test equipment of the example of this embodiment is equipped with a pattern generator 1100a and a separate error detector 1120a that are in communication over a data link or channel 1300a. Like the previous embodiment, the error detector 1120a includes a forward error correct (FEC) decoder. The pattern generator 1100a is configured to generate a given test bit pattern which is output as a digital stress (or stimulus) signal on a downlink channel 1140. The given test bit pattern may optionally be stored in advance and retrieved from a memory (not shown) contained within the pattern generator 1100a.

The DUT 2000 includes a receiver (Rx) 2100, a transmitter Tx 2200 and a forward error correction (FEC) encoder 2400 operative included in the loopback circuitry 2500 of the DUT 2000. In an embodiment, the FEC encoder 2400 is enabled upon entry of the DUT 2000 into a loopback mode. The stress signal transmitted on the uplink channel 1140 is received by the Rx 2100, and the loopback circuitry 2500 of the DUT 2000 is operative in the loopback mode to reconstruct the received test bit pattern and to apply the thus reconstructed data to the enabled FEC encoder 2400.

The data that has been encoded by the FEC encoder is then transmitted through the Tx 2200 on a back channel 2600. The FEC decoder of the error detector 1120a is configured to decode the FEC encoded test bit pattern data received on the back channel 2600 to obtain a data pattern. This decoded data pattern is then analyzed by the error detector 1120a to see how closely it matches the data bits of the test bit pattern received from the pattern generator 1100a over the data link 1300a. The BER of the DUT 2000 is determined accordingly. Optionally, the error detector 1120a may store the transmitted test bit pattern received from the pattern generator 1100a in memory (not shown).

As with the embodiment of FIG. 2, the FEC encoding in the loopback is effective to compensate for bit errors introduced in back channel 2600. The FEC encoding adds redundant bits to data stream, while the FEC decoder is operative such that the error detector 1120a recognizes only the portion of the data that contains no apparent errors. Errors introduced by the back channel 2600 may be eliminated leaving only those errors caused by the DUT 2000 for comparison and calculation of the BER, thus allowing for a more reliable assessment of the BER of the DUT 2000.

A method of determining the BER of a DUT will now be described with reference to FIG. 4. The left side of the figure are processes carried out by the BER measurement equipment, and the right side of the figure are process carried out within the DUT.

Figure 4:
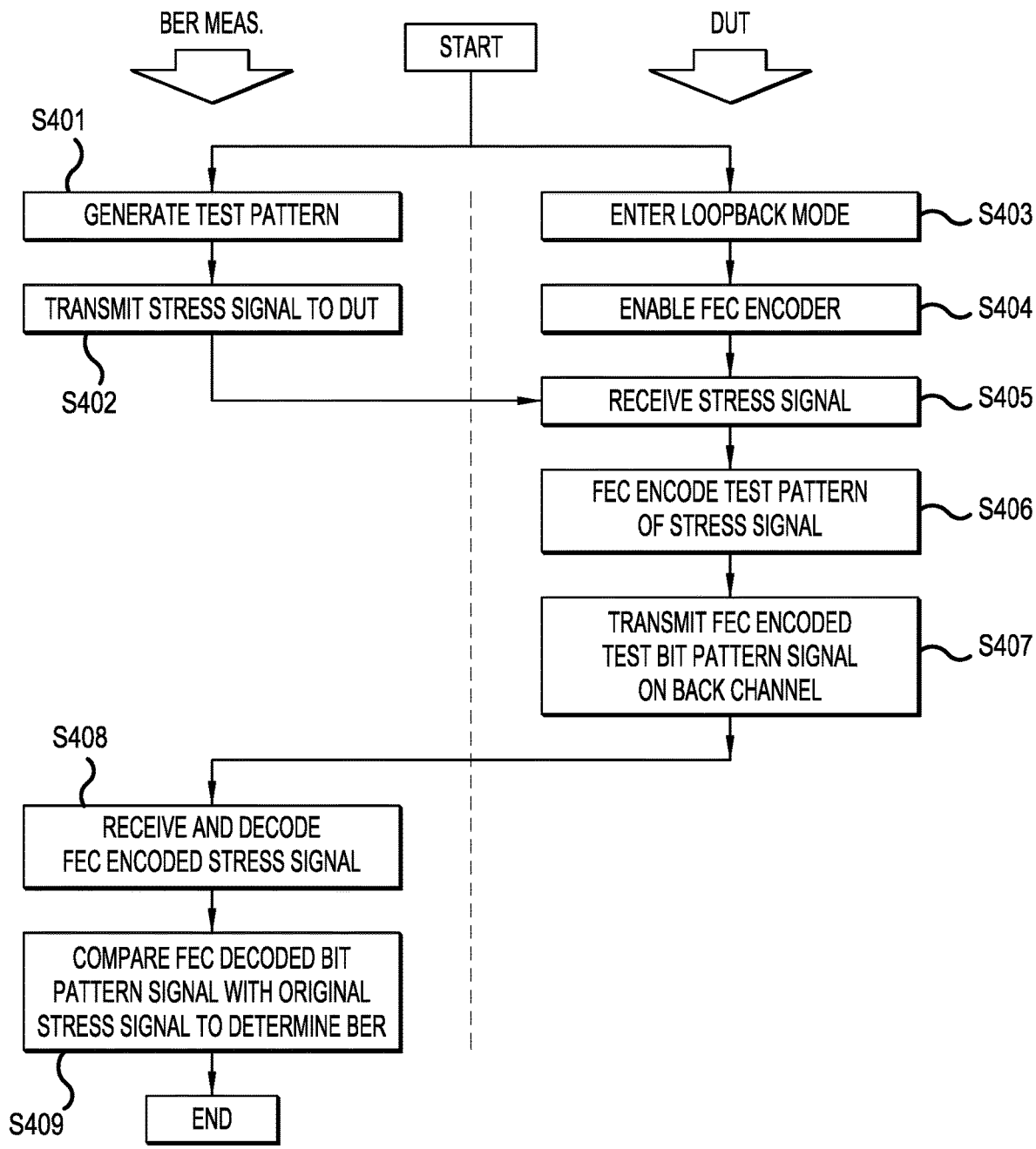
FIG. 4 is a flow-chart for describing a method of measuring a bit error ratio according to an embodiment of the inventive concepts.

Referring to FIG. 4, as well as previously described FIGS. 2 and 3, the pattern generator 1100/1100a of the BER measurement equipment generates a test bit pattern (S401), and a corresponding stress signal is applied to the uplink channel 1140 (S402). In the meantime, the DUT 2000 enters the previously described loopback mode (S403), and the FEC encoder 2400 is enabled (S404).

The stress signal transmitted on the uplink channel 1140 is received by the DUT 2000 (S405), and the data bit pattern of the stress signal is encoded by the enabled FEC encoder 2400 (406). The FEC encoded test bit pattern is then transmitted by the DUT 2000 on the back channel 2600 (S407).

The FEC encoded test bit pattern transmitted on the back channel 2600 is received and decoded by the FEC decoder of the error detector 1120/1120a (S408). The error detector 1120/1120a determines the BER of the DUT 2000 by comparing the FEC decoded bit pattern with the original test bit pattern (S409).

As with the previous embodiments, the FEC encoding in the loopback of the method of FIG. 4 is effective to compensate for bit errors introduced in back channel 2600. The FEC encoding adds redundant bits to data stream, while the FEC decoder is operative such that the error detector 1120/1120a recognizes only the portion of the data that contains no apparent errors. Errors introduced by the back channel 2600 may be eliminated leaving only those errors caused by the DUT 2000 for comparison and calculation of the BER, thus allowing for a more reliable assessment of the BER of the DUT 2000.

In the embodiments described above, it is noted that the FEC encoding adds bits to the data stream for the redundancy needed to correct errors. As such, the return path may operate at a slightly higher data rate than the receiver of the DUT 2000. Alternatively, symbols of the data stream may be replaced by the FEC encoder to keep the data rates the same. As another alternative, the error detector 1120/1120a may be augmented by clock data recovery (CDR) circuitry to extract timing information from the signal containing the FEC encoded test bit pattern transmitted on the back channel 2600.

It is also noted that the DUT 2000 may have FEC decoding as well as encoding capabilities. In this case, in an embodiment, the FEC decoding and encoding may be disabled and enabled independently of each other. Likewise, the error detector 1120/1120a may have FEC encoding capabilities in addition to decoding capabilities that may be enabled and disabled independently of each other.

While the disclosure references exemplary embodiments, it will be apparent to those skilled in the art that various changes and modifications may be made without departing from the spirit and scope of the present teachings. Therefore, it should be understood that the above embodiments are not limiting, but illustrative.

What is claimed is:

1. A method of determining the bit error ratio (BER) of a device under test (DUT), comprising:
   transmitting a first signal of an original test bit pattern over a first channel to a receiver of the DUT;
   forward error correction (FEC) encoding the original test bit pattern of the first signal transmitted to the receiver of the DUT in a loopback mode of the DUT to generate an FEC encoded test bit pattern;
   transmitting a second signal of the FEC encoded test bit pattern from a transmitter of the DUT over a second channel; and
   FEC decoding the FEC encoded test bit pattern of the second signal to obtain a decoded test bit pattern and comparing the decoded test bit pattern with the original test bit pattern to determine a BER of the DUT.

2. The method of claim 1, wherein an FEC encoder of the DUT is enabled when the DUT is in the loopback mode.

3. The method of claim 1, further comprising retrieving data of the original test bit pattern from a memory and generating the first signal from the retrieved data.

4. The method of claim 1, further comprising retrieving the data of the original test bit pattern from the memory and comparing the decoded test bit pattern with the retrieved data.

5. The method of claim 1, further comprising transmitting the original test bit pattern over a data link to an external error detector for comparison with the decoded test bit pattern.

6. The method of claim 1, wherein a data rate on the second channel is greater than a data rate on the first channel.

7. The method of claim 6, further comprising subjecting the second signal to clock data recovery.

8. A test set-up for testing a bit error ratio (BER), comprising:
   a pattern generator configured to generate an original test bit pattern, and to transmit a first signal of the original test bit pattern on a first channel;
   a device under test (DUT) including a receiver in communication with the first channel, a transmitter in communication with a second channel, and a forward error correction (FEC) encoder operative within a loopback between the receiver and transmitter, wherein the DUT is operative in a loopback mode to FEC encode the original test bit pattern of the first signal transmitted on the first channel to obtain an FEC encoded test bit pattern, and to transmit a second signal of the FEC encoded test bit pattern on the second channel; and
   an error detector including a forward error correction (FEC) decoder, the error detector configured to decode an FEC encoded test bit pattern of the second signal received on the second channel to obtain a decoded test bit pattern, and to compare the decoded test bit pattern with the original test bit pattern to determine a BER of the DUT.

9. The test set-up as claimed in claim 8, further comprising a memory for storing the original test bit pattern, and supplying the original test bit pattern to the pattern generator and the error detector.

10. The test set-up of claim 8, wherein an FEC encoder of the DUT is enabled when the DUT is in the loopback mode.

11. The test set-up of claim 8, wherein data of the original test bit pattern are retrieved from a memory and the first signal is generated from the retrieved data.

12. The test set-up of claim 11, wherein the data of the original test bit pattern are retrieved from the memory and the decoded test bit pattern is compared with the retrieved data.

13. The test set-up of claim 8, wherein the original test bit pattern is transmitted over a data link to an external error detector for comparison with the decoded test bit pattern.

14. The test set-up of claim 8, wherein a data rate on the second channel is greater than a data rate on the first channel.

15. The test set-up of claim 8, wherein the second signal is subjected to clock data recovery.

16. A device operative in a loopback mode for testing of the device, the device comprising:
   a receiver circuit for receiving a first signal on a first channel;
   a transmitter circuit transmitting a second signal on a second channel;
   loopback circuitry between the receiver and the transmitter and including a forward error correction (FEC) encoder, wherein in the loopback mode the FEC encoder is operative to FEC encode a test bit pattern of a first signal transmitted to the receiver on the first channel to obtain an FEC encoded test bit pattern, and the transmitter is operative to transmit a second signal of the FEC encoded test bit pattern on the second channel.

17. The device of claim 16, wherein an FEC encoder of the DUT is enabled when the DUT is in the loopback mode.

18. The device of claim 16, wherein data of the original test bit pattern are retrieved from a memory and the first signal is generated from the retrieved data.

19. The device of claim 18, wherein the data of the original test bit pattern are retrieved from the memory and the decoded test bit pattern is compared with the retrieved data.

20. The test device of claim 16, wherein the original test bit pattern is transmitted over a data link to an external error detector for comparison with the decoded test bit pattern.

* * * * *

UNITED STATES PATENT AND TRADEMARK OFFICE
CERTIFICATE OF CORRECTION

| | |
|---|---|
| PATENT NO. | : 11,228,380 B2 |
| APPLICATION NO. | : 17/007190 |
| DATED | : January 18, 2022 |
| INVENTOR(S) | : Martin Heinen et al. |

It is certified that error appears in the above-identified patent and that said Letters Patent is hereby corrected as shown below:

In the Claims

Claim 20, Column 7, Line 15, delete "test device" and insert -- device --.

Signed and Sealed this
Twenty-second Day of March, 2022

Drew Hirshfeld
*Performing the Functions and Duties of the*
*Under Secretary of Commerce for Intellectual Property and*
*Director of the United States Patent and Trademark Office*